(12) United States Patent
Gong et al.

(10) Patent No.: US 8,829,258 B2
(45) Date of Patent: Sep. 9, 2014

(54) INTEGRATED FCC BIOMASS PYROLYSIS/UPGRADING

(75) Inventors: Kening Gong, Bartlesville, OK (US); Alexandru Platon, Bartlesville, OK (US); Terry S. Cantu, Bartlesville, OK (US); Daren E. Daugaard, Skiatook, OK (US)

(73) Assignee: Phillips 66 Company, Houston, TX (US)

( * ) Notice: Subject to any disclaimer, the term of this patent is extended or adjusted under 35 U.S.C. 154(b) by 234 days.

(21) Appl. No.: 13/297,337

(22) Filed: Nov. 16, 2011

(65) Prior Publication Data

US 2012/0160741 A1 Jun. 28, 2012

Related U.S. Application Data

(60) Provisional application No. 61/427,270, filed on Dec. 27, 2010.

(51) Int. Cl.
| | |
|---|---|
| *C10G 11/00* | (2006.01) |
| *C10G 11/18* | (2006.01) |
| *C10G 3/00* | (2006.01) |
| *C10G 1/00* | (2006.01) |

(52) U.S. Cl.
CPC ............... *C10G 1/002* (2013.01); *C10G 11/18* (2013.01); *C10G 2400/08* (2013.01); *C10G 2300/1018* (2013.01); *C10G 3/62* (2013.01); *C10G 2300/44* (2013.01); *C10G 2400/20* (2013.01); *C10G 2300/4093* (2013.01); *C10G 3/42* (2013.01); *C10G 2300/1014* (2013.01); *C10G 2400/04* (2013.01); *Y02E 50/13* (2013.01); *C10G 2400/02* (2013.01); *C10G 2400/28* (2013.01); *C10G 3/57* (2013.01)
USPC ........... 585/240; 585/469; 585/638; 585/733; 208/113; 44/307; 44/605; 44/606

(58) Field of Classification Search
USPC .................... 208/113–124; 44/307, 605–606; 585/469, 638, 733
See application file for complete search history.

(56) References Cited

U.S. PATENT DOCUMENTS

| 4,828,680 A | 5/1989 | Green et al. |
| 2010/0051874 A1 | 3/2010 | O'Connor et al. |

(Continued)

FOREIGN PATENT DOCUMENTS

EP 1892280 2/2008

(Continued)

OTHER PUBLICATIONS

"Evaluating KiOR." (http://) theenergycollective.com/robertrapier/42929/evaluating-kior (2010).

(Continued)

*Primary Examiner* — Brian McCaig
(74) *Attorney, Agent, or Firm* — Phillips 66 Company

(57) ABSTRACT

Integrating a biomass pyrolysis and upgrading process into a fluid catalytic cracking unit. The process uses conventional FCC feed and a mixture of a solvent and biomass to produce upgraded fuel products. A slurry stream composed of solid biomass particles and a solvent is fed into an FCC riser through a slurry pump to achieve biomass pyrolysis and in situ pyrolysis oil upgrading. The catalytic cracking of the conventional petroleum feed also occurs in the riser.

9 Claims, 1 Drawing Sheet

(56) References Cited

U.S. PATENT DOCUMENTS

2011/0094147 A1    4/2011  Bartek et al.
2011/0154720 A1*   6/2011  Bartek et al. ................. 44/307

FOREIGN PATENT DOCUMENTS

| JP | 2007177193 | 7/2007 |
| WO | 2008020047 | 2/2008 |
| WO | 2009118352 | 10/2009 |
| WO | 2010002792 | 1/2010 |
| WO | 2010002886 | 1/2010 |

OTHER PUBLICATIONS

Domine, et al., "Co-processing of oxygenated biomass compounds and hydrocarbons for sustainable fuel production" Communications, www.biocoup.com/fileadmin/user/pdf/results/07_BIOCOUP_08.pdf (2008).
Envergent, "The Practical, Proven Path to Green Energy." www.uop.com/renewables/Envergent%20Brochure%203-10.pdf (2010).
Lappas et al., "Biomass pyrolysis in a circulating fluid bed reactor for the production of fuels and chemicals," Fuel, Inc., Science and Technology Press, Guildford, GB, vol. 81, No. 16, pp. 1007-2095.
PCT/US2011/060954 PCT International Search Report (PCT/ISA/210) Dated Feb. 27, 2012.

* cited by examiner

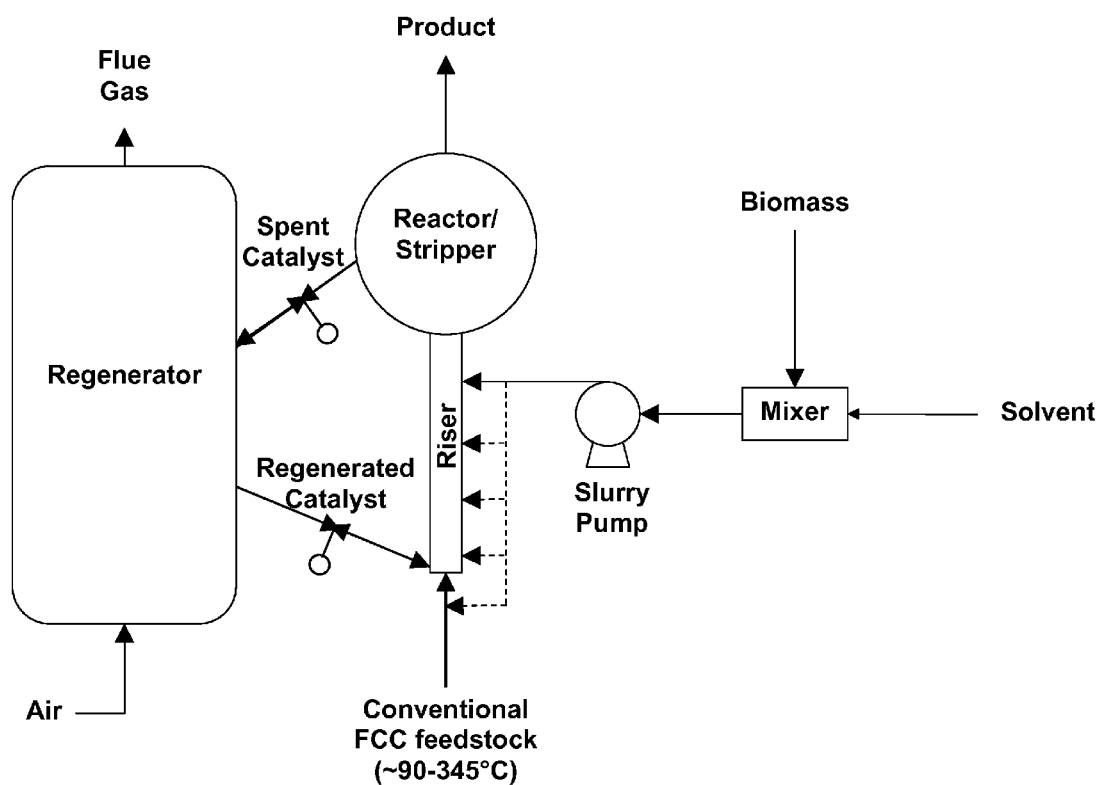

INTEGRATED FCC BIOMASS PYROLYSIS/UPGRADING

CROSS-REFERENCE TO RELATED APPLICATIONS

This application is a non-provisional application which claims benefit under 35 USC §119(e) to U.S. Provisional Application Ser. No. 61/427,270 filed Dec. 27, 2010, entitled "INTEGRATED FCC BIOMASS PYROLYSIS/UPGRADING," which is incorporated herein in its entirety.

STATEMENT REGARDING FEDERALLY SPONSORED RESEARCH

None.

FIELD OF THE INVENTION

This invention relates to biomass pyrolysis and pyrolysis oil upgrading process with a fluid catalytic cracking unit.

BACKGROUND OF THE INVENTION

The use of renewable energy sources is becoming increasingly necessary to reduce emissions of carbon based fuels and provide alternatives to petroleum based energy and feedstocks. One of the alternatives being explored is the use of biomass. Biomass is any carbon containing material derived from living or formerly living organisms, such as wood, wood waste, crops, crop waste, waste, and animal waste.

Pyrolysis, which is the thermal decomposition of a substance into its elemental components and/or smaller molecules, is used in various methods developed for producing hydrocarbons, including but not limited to hydrocarbon fuels, from biomass. Pyrolysis requires moderate temperatures, generally greater than about 325° C., such that the feed material is sufficiently decomposed to produce products which may be used as hydrocarbon building blocks.

Generally the pyrolysis of biomass produces four primary products, namely water, "bio-oil," also known as "pyrolysis oil," char, and various gases ($H_2$, CO, $CO_2$, $CH_4$, and other light hydrocarbons) that do not condense, except under extreme conditions.

Fast pyrolysis is one method for the conversion of biomass to bio-oil. Fast pyrolysis is the rapid thermal decomposition of organic compounds in the absence of atmospheric or added oxygen to produce liquids, char, and gas. Generally, fast pyrolysis uses dry (<10% moisture) feedstock of biomass comminuted into small particles (between approximately 0.1-3 mm), moderate temperatures (325-750° C.), and short residence times (0.5-2 seconds). This pyrolysis reaction may be followed by rapid quenching to avoid further decomposition of the pyrolysis products and secondary reactions amongst the pyrolysis products.

Fast pyrolysis affords operation at atmospheric pressure, moderate temperatures, and with low or no water usage. Bio-oil yields typically range from 50-75% mass of input biomass and are heavily feedstock dependent. Generally, known methods of bio-oil production result in bio-oil with high oxygen and water content; such oxygen and water content may result in storage instability and phase-separation issues.

For example, the pyrolysis of a wood based biomass will produce a mixture of organic compounds such as lignin fragments, aldehydes, carboxylic acids, phenols, furfurals, alcohols, and ketones, as well as water. Unfortunately, compounds such as the aldehydes and acids may react with other components of the bio-oil, creating instability, corrosiveness, and poor combustion characteristics.

Upgrading pyrolysis oils is difficult due to acidity of the pyrolysis oil, contamination with other compounds, and the tendency to form coke by-products. Damaging costly cracking catalysts is expensive and removes any profit margins from processing biomass and pyrolysis oil to high value hydrocarbons. Therefore, it would be desirable to have a method of cracking biomass and upgrading pyrolysis oil into useful products in a cost effective manner.

BRIEF SUMMARY OF THE DISCLOSURE

Integrating a biomass pyrolysis and pyrolysis oil upgrading process into a fluid catalytic cracking (FCC) unit. The process uses conventional FCC feed and a mixture of a solvent and biomass to produce upgraded fuel products. In one embodiment, a slurry stream composed of solid biomass particles and a solvent is fed into an FCC riser through a slurry pump to achieve biomass pyrolysis and in situ pyrolysis oil upgrading. The catalytic cracking of the conventional FCC feed also occurs in the riser. The solid and vapor products are separated by cyclones in the FCC reactor. Solid products entrained by the FCC catalyst particles are burned off in the regenerator and the vapor (conversion) product is distilled into various streams including naphtha, LCO, and decant oil in the main fractionator.

In one embodiment, an FCC unit with a mixed feed stream having a solvent stream and a biomass feed stream comprising biomass feedstock; a slurry pump, mixer, or combination of a mixer and slurry pump to transport the mixed feed stream to a riser; a feed stream containing conventional FCC feedstock; an FCC riser in which the mixed feed stream and the conventional FCC feedstock react with a regenerated catalysts for catalytic cracking and upgrading; a reactor/stripper for separating upgraded fuel products from the deactivated FCC catalyst; and a regenerator to regenerate deactivated (spent) catalyst to regenerated catalyst. Long chain petroleum compounds and biomass are upgraded to fuel products in the FCC riser.

In another embodiment, biomass is cracked and upgraded to fuel products by mixing a biomass feed stream with a solvent to produce a mixed feed stream, transporting the mixed feed stream through a slurry pump, mixer, or mixer and slurry pump to a riser; combining the mixed feed stream with a conventional FCC feed stream and regenerated catalyst in the riser, cracking and upgrading the biomass feed to upgraded fuel products in the riser; separating upgraded fuel products from deactivated catalyst in reactor/stripper, regenerating the deactivated FCC catalyst in the regenerator; and recycling the regenerated FCC catalyst to the FCC riser.

Biomass feedstock may contain wood, paper, crops, animal fats, plant oils, biological waste, algae, or mixtures of these biological materials. The upgraded fuel products may contain pyrolysis oil, upgraded pyrolysis oil, gasoline, light cycle oil, light gases, #6 fuel oil, decant oil, naphtha, raffinate, cyclohexane, n-hexane, kerosene, diesel, fuel oil, methane, ethane, ethylene, propane, propylene, mixed butanes, petroleum coke and mixtures of these products. Pyrolysis oil is derived from pyrolysis of biomass including lignin fragments, aldehydes, carboxylic acids, carbohydrates, phenols, furfurals, alcohols, ketones, triglycerides, and combinations thereof.

Solvent may contain pyrolysis oil, conventional FCC feed, heavy vacuum oil, atmospheric distillation bottoms, coker gas oil, hexanes, naphthas, light cycle oil, heavy cycle oil, fuel oil, decant oil, raffinate, cyclohexane, n-hexane, kerosene, diesel, water, steam, alcohols, polyols, and mixtures of these solvents.

A mixed feed stream contains biomass and solvent in varying concentrations. Mixed feed streams may contain between about 0.1% to 90% biomass with between about 99.9% to 10% solvent, respectively; including approximately 99% solvent and 1% biomass, approximately 95% solvent and 5% biomass, approximately 90% solvent and 10% biomass, approximately 85% solvent and 15% biomass, approximately 80% solvent and 20% biomass, approximately 75% solvent and 25% biomass, approximately 70% solvent and 30% biomass, approximately 65% solvent and 35% biomass, approximately 60% solvent and 40% biomass, approximately 55% solvent and 45% biomass, approximately 50% solvent and 50% biomass, approximately 45% solvent and 55% biomass, approximately 35% solvent and 65% biomass, approximately 30% solvent and 70% biomass, approximately 25% solvent and 75% biomass, approximately 20% solvent and 80% biomass, approximately 15% solvent and 85% biomass, or approximately 10% solvent and 90% biomass.

The FCC riser may be fed with a mixed feed stream and a conventional FCC feedstock. The FCC riser may be fed with between approximately 10 and 90% mixed feed stream and between 90 and 10% conventional FCC feed; approximately 10% mixed feed stream and 90% conventional FCC feed, approximately 20% mixed feed stream and 80% conventional FCC feed, approximately 30% mixed feed stream and 70% conventional FCC feed, approximately 40% mixed feed stream and 60% conventional FCC feed, approximately 50% mixed feed stream and 50% conventional FCC feed, approximately 60% mixed feed stream and 40% conventional FCC feed, approximately 70% mixed feed stream and 30% conventional FCC feed, approximately 80% mixed feed stream and 20% conventional FCC feed, approximately 90% mixed feed stream and 10% conventional FCC feed, or other. Although a variety of mixed feed stream and conventional FCC feed combinations are demonstrated here, a variety of intermediate concentrations may be used between 0.1 and 99.9% mixed feed stream with between 99.9 and 0.1% conventional FCC feed.

The mixed feed stream may be injected at one or more locations from the bottom of the riser, including approximately ¾, ⅔, ½, ⅓, ¼ along the riser, or at the top of the riser. Biomass contact time with the catalyst may be between 0.1 and 4 seconds, including approximately 0.2, 0.4, 0.6, 0.8, 1.0, 1.25, 1.5, 1.75, 2.0, 2.25, 2.5, 2.75, 3.0, 3.5, and 4.0 seconds or there may be multiple contact times if two or more injection sites are used along the riser.

In another embodiment, the FCC riser may be fed with a conventional FCC feedstock and a mixed feed stream in any ratio by changing the flow rate of each into the FCC riser. The FCC riser may be fed with approximately 99:1, 49:1, 20:1, 10:1, 9:1, 8:2, 7:3, 6:4, 5:5, 4:6, 3:7, 2:8, 1:9 FCC feedstock to mixed feed stream. Additionally, the FCC unit may be fed with a mixed feed stream containing between 0.1-90% biomass with 99.9-10% solvent. The mixed feed stream may include approximately 5% biomass with 95% decant oil and conventional FCC feed as a solvent; approximately 10% biomass with 90% conventional FCC feed as a solvent; approximately 20% biomass with 80% conventional FCC feed as a solvent; approximately 30% biomass with 70% conventional FCC feed as a solvent; approximately 50% biomass with 50% pyrolysis oil as a solvent; approximately 25% biomass with 75% decant oil as a solvent; approximately 50% biomass with 50% decant oil and pyrolysis oil as a solvent; approximately 90% biomass with 10% naphtha as a solvent; approximately 70% biomass with 30% decant oil and conventional FCC feed as a solvent; approximately 30% biomass with 70% decant oil and pyrolysis oil as a solvent; approximately 50% biomass with 50% conventional FCC feed as a solvent; or approximately 50% biomass with 50% pyrolysis oil and conventional FCC feed as a solvent.

BRIEF DESCRIPTION OF THE DRAWINGS

A more complete understanding of the present invention and benefits thereof may be acquired by referring to the follow description taken in conjunction with the accompanying drawings in which:

FIG. 1: An FCC unit where a solvent (such as conventional FCC feedstock, pyrolysis oil, hexane or other solvent) is mixed with biomass; the mixed feedstock, as an additional feed stream to the conventional FCC feed stream, is fed through a slurry pump to a riser. The upgraded feeds go into a reactor/stripper where vapor product is separated from the deactivated catalyst which entrains coke. The coke on the deactivated catalyst is then burned off in a regenerator and the regenerated catalyst is recycled back to riser for cracking reaction.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Abbreviations include fluid catalytic cracking (FCC), advanced cracking evaluation (ACE), light petroleum gas (LPG), light cycle oil (LCO), and molecular weight (MWT).

Degrees Fahrenheit (° F.), where used, can easily be converted to degrees Celsius (° C.) using the equation $t_C = 0.56(t_F-32) = 5/9(t_F-32)$ where $t_C$ is temperature in degrees Celsius and $t_F$ is temperature in degrees Fahrenheit. Some key temperatures are 32° F.=0° C.; 200° F.=93.3° C.; 500° F.=260° C.; 620° F.=327° C.; 650° F.=343° C.; and 700° F.=371° C. Although absolute temperatures may be calculated, temperatures across a reaction bed, reactor, and throughout the system may have some variation of up to 10 or 20%. Thus about 40° F. is approximately about 5° C.; about 200° F.~about 90° C.; about 620° F.~about 330° C.; about 650° F.~about 340° C.; and about 700° F.~about 370° C.

As used herein, the term "biomass" includes any renewable source (living or formerly living) but does not include oil, natural gas, and/or petroleum. Biomass thus includes wood, paper, crops, animal and plant fats, triglycerides, biological waste, algae, and the like.

"Bio-oil" or "pyrolysis oil" as used herein, is a complex mixture of several hundred organic compounds, such as lignin fragments, aldehydes, carboxylic acids, carbohydrates, phenols, furfurals, alcohols, and ketones, derived from fast pyrolysis of biomass feedstocks. Pyrolysis oil without additives or processing tends to be very corrosive and damaging to transportation, refinery, and other industry equipment.

Fluid catalytic cracking or FCC process vaporizes and breaks long-chain, high-boiling hydrocarbon liquids into shorter molecules by contacting the feedstock, at high temperature and moderate pressure, with a fluidized powdered catalyst. FCC units include "stacked" and "side-by-side" reactors, as well as other configurations. In a stacked reactor, the reactor and the catalyst regenerator are contained in a single vessel with the reactor above the catalyst regenerator. The side-by-side reactor has separate reactor and catalyst regenerator in two separate vessels, often side by side.

As used herein conventional FCC feed contains a portion of the crude oil that has an initial boiling point of about 340° C. (645° F.) or higher at atmospheric pressure and an average molecular weight ranging from above about 200 to over 600 MWT or higher. This portion of crude may also be called heavy vacuum gas oil. The heavy vacuum gas oil is the primary feed of FCC units. Often other streams, such as atmospheric distillation bottoms and coker gas oil, are mixed with the heavy vacuum gas oil as feed for FCC units.

Long chain carbon compounds include long chain hydrocarbons typically found in a conventional petroleum based FCC feed stream as well as hydrocarbons, lignins, carbohydrates, lipids, fats, cholesterols, polyols, and other complex molecules found in biological materials including those found in biomass, pyrolysis oil, and other biologically derived feed streams.

Solvent as used herein may include pyrolysis oil, conventional FCC feed, heavy vacuum oil, atmospheric distillation bottoms, coker gas oil, hexanes, naphthas, light cycle oil, fuel oil, decant oil, raffinate, cyclohexane, N-hexane, kerosene, diesel, water, steam, alcohols, polyols, and the like that either dissolve, suspend, emulsify, or otherwise fluidize biologically derived feed streams.

Light petroleum gases (LPG) include propane; propylene; mixed butanes; mixed butylenes; and other small hydrocarbons.

The following examples of certain embodiments of the invention are given. Each example is provided by way of explanation of the invention, one of many embodiments of the invention, and the following examples should not be read to limit, or define, the scope of the invention.

Example 1

A slurry stream composed of (1) solid biomass particles and (2) conventional FCC feed is fed through a slurry pump into an FCC riser to achieve biomass pyrolysis and in situ pyrolysis oil upgrading. Another feed stream contains only conventional FCC feed stream is also injected into the riser for conventional catalytic cracking. The injection location for the mixed biomass feedstock could be located anywhere in the riser/reactor and may be altered dependent upon the characteristics of the biomass feed and the temperature of the recycled catalyst. For more difficult biomass materials the mixed biomass feed may be injected at low concentrations with the FCC feed stream at the base of the riser. This will allow small amounts of the biomass feedstock to be converted over longer periods of time to upgraded fuel products. For easier to upgrade biomass materials, higher concentrations of the mixed biomass feed may be injected at one or more injection points along the riser dependent upon the temperature and catalyst circulation rate in the riser.

The slurry stream temperature is maintained sufficiently low to prevent pyrolysis reaction in the pipeline (before entering the riser). Fast pyrolysis of biomass occurs in the riser with high heating rate and short residence time. The pyrolysis oil is diluted with the hydrocarbon vapors, resulting in reduced undesired pyrolysis secondary reactions. In addition, in situ pyrolysis oil upgrading is achieved in the presence of FCC catalyst and additives such as ZSM-5. The solid and vapor products are separated by cyclones in the FCC reactor. The solid products (i.e., coke and char) entrained by catalysts are burned off in the regenerator, and the volatile product stream is distillated into various fractions (e.g., LPG, naphtha, LCO, and decant oil) in the main fractionator.

In one embodiment, biomass particles with diameter in the range of 0.1-5000 μm are mixed with recycled decant oil to form a slurry stream. The temperature of the mixed slurry stream is below approximately 350° C. (662° F.) to avoid slow pyrolysis reactions in the feed line and thermal cracking of the recycled decant oil. The injection point of the slurry stream is located in the middle section of the riser allowing short (approximately 1 sec) residence time for pyrolysis and upgrading.

Example 2

Reaction feasibility is assessed using an autoclave catalytic reactor. Feeds containing biomass, pyrolysis oil, conventional FCC feed streams and decant oil are fed into the catalytic reactor and measured across a variety of reaction temperatures, feed residence time, and catalyst to feed ratios. The reaction temperature, feed stream rates, feed residence time, biomass/solvent/conventional FCC feed concentrations, and FCC catalyst loadings are modified to obtain maximum fuel range products. The mixed feed stream may contain between 0.1 and 90% biomass (see TABLE 1).

TABLE 1

Feed Composition for the FCC

| | Mixed feed stream | | Conv. FCC feed |
|---|---|---|---|
| | Biomass (%)* | % Solvent* | % Conv. Feed |
| 1 | 10% | 10% Conv. FCC feed | 80% |
| 2 | 5% | 10% Conv. FCC feed, 5% pyrolysis oil | 80% |
| 3 | 10% | 5% Conv. FCC feed, 5% pyrolysis oil | 80% |
| 4 | 20% | 5% decant oil | 75% |
| 5 | 10% | 5% decant oil, 10% pyrolysis oil | 75% |
| 6 | 10% | 20% decant oil | 70% |
| 7 | 5% | 20% decant oil, 5% pyrolysis oil | 70% |
| 8 | 50% | 50% Conv. FCC feed | 0 |
| 9 | 25% | 50% Conv. FCC feed, 25% pyrolysis oil | 0 |

*% is final % w/v as determined by pre-mixture mass and rate of delivery.

Example 3

Reaction conditions obtained in the autoclave catalytic reactor are revised to account for larger reaction beds and greater volumes in the ACE (Advanced Catalyst Evaluation) pilot scale tests. Minimal modulation of the feed residence time, biomass/solvent/conventional FCC feed ratios, catalyst to feed ratios, and reaction temperatures are required to obtain maximum amount of fuel range products. Once reaction rates and mechanism are determined, conditions are optimized for full scale refinery production. During ACE pilot scale tests, minimum and maximum concentrations of biomass are determined. This allows the full scale refinery to modulate biomass feed stream to maintain steady bio-fuel conversion and maximum upgraded fuel products.

Residence time may vary dependent upon injection point. Residence time is approximately 1 to 4 seconds from bottom of riser to top of the riser. When the injection is in the middle, residence time is approximately half of that from bottom of riser to top of riser. Injection at the top of the riser can lead to much lower residence times than 1 second. Conventional FCC feed temperature is normally between approximately 90° C. to about 345° C. (~200° F.-650° F.), while riser temperature is approximately 400° C. to about 650° C. (~750° F.-1200° F.). Fast pyrolysis occurs above 350-400° C. (~660° F.-750° F.).

This process may be conducted in batch or continuous flow reactions across a range of biomass, pyrolysis oil, decant oil, and conventional FCC feed stream concentrations. Concentrations may be measured in % w/v, % v/v, Molar concentration, or they may be interchanged dependent upon the feed streams and information provided. Biomass concentration may range from less than 0.1% w/v up to approximately 90% w/v. Biomass may be supplemented with pyrolysis oil to further increase the amount of renewable fuel produced. In one embodiment, the biomass may be mixed with a solvent at a lower temperature approximately 90° C. (200° F.) prior to injection into the riser at a much higher temperature, approximately 400° C. to 650° C. (~750° F.-1200° F.). This prevents slow pyrolysis and coke formation before catalytic cracking and upgrading. In another embodiment the conventional FCC feed is mixed with biomass prior to entering the riser. In one embodiment, the biomass feed is not cooled, and the mixing process is conducted rapidly just prior to entering the riser.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 4,828,680; WO9013613; EP0424475; EP0424475; "Catalytic Cracking of Hydrocarbons." Green, et al., Mobil Oil Corp. (1989).
2. WO2008020047; CA2660755; EP1892280; WO2008020047; MX2009001721; EP2059576; KR20090052363; IN1471/CHENP/2009; CN101558135; JP2010500464; "Fluid Catalytic Cracking Of Oxygenated Compounds." O'Connor, Bioecon Internat. Holding N V (2007).
3. JP2007177193, "Process for Treatment of Biomass Using Fluid Catalytic Cracking" Fujiyama and Okuhara, Nippon Oil Corp (2007)
4. WO2009118352; EP2107100; "Multi-stage biocatalytic cracking process." O'Connor, KiOR Inc. (2008).
5. US2010051874; EP1878695; WO2008006904; KR20090029304; EP2051933; IN0799/CHENP/2009; CN101511726; JP2009543924; "Processing Of Biomass-Derived Oxygenates With Particles Comprising A Coke Deposit." O'Connor, et al., Bioecon Internat. Holding N V (2009).
6. WO2009118352; EP2107100; "Multi-Stage Biocatalytic Cracking Process." O'Connor, KiOR Inc (2009).
7. WO2010002792, "Co-Processing Solid Biomass in Conventional Petroleum Refining Process Unit." Yanik, et al., KiOR Inc (2010).
8. WO2010002886, "Producing Fuel And Specialty Chemicals From Biomass Containing Triglycerides And Cellulose O'Connor and Yanik, KiOR Inc (2010).
9. "Evaluating KiOR." (http://) theenergycollective.com/robertrapier/42929/evaluating-kior (2010).
10. Domine, et al., "Co-processing of oxygenated biomass compounds and hydrocarbons for sustainable fuel production" Communications, www.biocoup.com/fileadmin/user/pdf/results/07_BIOCOUP_08.pdf (2008).
11. Envergent, "The Practical, Proven Path to Green Energy." www.uop.com/renewables/Envergent%20Brochure%203-10.pdf (2010).

The invention claimed is:

1. A method of upgrading biomass to fuel products comprising:
   a) mixing a biomass feed stream with a solvent to produce a mixed feed stream,
   b) transporting the mixed feed stream through a slurry pump, mixer, or mixer and slurry pump to a riser,
   c) combining the mixed feed stream (a) with a conventional FCC feed stream and regenerated catalyst in the riser, wherein the mixed feed stream is injected at one or more injection points along the riser that are distinct from the injection point of the conventional FCC feed stream,
   d) cracking and upgrading the mixed feed stream and the conventional FCC feed stream to upgraded fuel products in the riser,
   e) separating the upgraded fuel products from deactivated catalyst in reactor/stripper,
   f) regenerating the deactivated catalyst in regenerator, and recycling the regenerated catalyst to the riser (c).

2. The method of claim 1, wherein said biomass feedstock contains wood, paper, crops, animal fats, plant oils, biological waste, algae, and mixtures thereof.

3. The method of claim 1, wherein said upgraded fuel products comprise one or more products selected from the group consisting of pyrolysis oil, upgraded pyrolysis oil, gasoline, light cycle oil, light gases, #6 fuel oil, decant oil, naphtha, raffinate, cyclohexane, n-hexane, kerosene, diesel, fuel oil, methane, ethane, ethylene, propane, propylene, mixed butanes, petroleum coke and combinations thereof.

4. The method of claim 3, wherein said pyrolysis oil contains one or more of the following products derived from pyrolysis of biomass including lignin fragments, aldehydes, carboxylic acids, carbohydrates, phenols, furfurals, alcohols, ketones, triglycerides, and combinations thereof.

5. The method of claim 1, wherein said solvent comprises pyrolysis oil, conventional FCC feed, heavy vacuum oil, atmospheric distillation bottoms, coker gas oil, hexanes, naphthas, light cycle oil, heavy cycle oil, fuel oil, decant oil, raffinate, cyclohexane, n-hexane, kerosene, diesel, water, steam, alcohols, polyols, and mixtures thereof.

6. The method of claim 1, wherein the mixed feed stream is injected at one or more locations that are distinct from the injection point of the conventional FCC feed stream, the one or more locations selected from, ¾, ⅔, ½, ⅓, ¼ along the riser, or at the top of the riser.

7. The method of claim 1, wherein the mixed feed stream contact time with the catalyst in the riser is between 0.1 and 4 seconds based on mixed feed stream injection locations and rate of flow in the riser.

8. The method of claim 1, wherein the riser is fed with a conventional FCC feedstock and a mixed feed stream in a ratio selected from the group consisting of:
   a) approximately 99:1 FCC feedstock to mixed feed stream,
   b) approximately 49:1 FCC feedstock to mixed feed stream,
   c) approximately 20:1 FCC feedstock to mixed feed stream,
   d) approximately 10:1 FCC feedstock to mixed feed stream,
   e) approximately 9:1 FCC feedstock to mixed feed stream,
   f) approximately 8:2 FCC feedstock to mixed feed stream,
   g) approximately 7:3 FCC feedstock to mixed feed stream,
   h) approximately 6:4 FCC feedstock to mixed feed stream,
   i) approximately 5:5 FCC feedstock to mixed feed stream,
   j) approximately 4:6 FCC feedstock to mixed feed stream,
   k) approximately 3:7 FCC feedstock to mixed feed stream,
   l) approximately 2:8 FCC feedstock to mixed feed stream, and
   m) approximately 1:9 FCC feedstock to mixed feed stream.

9. The method of claim 1, wherein the mixed feed stream comprises between 0.1-90% biomass with 99.9-10% solvent, including a mixed feed stream selected from the group consisting of:
   a) approximately 5% biomass with 95% decant oil and conventional FCC feed as a solvent;
   b) approximately 10% biomass with 90% conventional FCC feed as a solvent;
   c) approximately 20% biomass with 80% conventional FCC feed as a solvent;
   d) approximately 30% biomass with 70% conventional FCC feed as a solvent;
   e) approximately 50% biomass with 50% pyrolysis oil as a solvent;
   f) approximately 25% biomass with 75% decant oil as a solvent;
   g) approximately 50% biomass with 50% decant oil and pyrolysis oil as a solvent;
   h) approximately 90% biomass with 10% naphtha as a solvent;
   i) approximately 70% biomass with 30% decant oil and conventional FCC feed as a solvent;
   j) approximately 30% biomass with 70% decant oil and pyrolysis oil as a solvent;
   k) approximately 50% biomass with 50% conventional FCC feed as a solvent; and
   l) approximately 50% biomass with 50% pyrolysis oil and conventional FCC feed as a solvent.

* * * * *